United States Patent [19]

Ogawa

[11] Patent Number: 4,875,759
[45] Date of Patent: Oct. 24, 1989

[54] OPTICAL FIBER AND METHOD OF PRODUCING THE SAME

[75] Inventor: Kazufumi Ogawa, Hirakata, Japan

[73] Assignee: Matsushita Electric Industrial Co., Ltd., Osaka, Japan

[21] Appl. No.: 158,111

[22] Filed: Feb. 16, 1988

Related U.S. Application Data

[62] Division of Ser. No. 799,452, Nov. 18, 1985, abandoned.

[30] Foreign Application Priority Data

Nov. 19, 1984 [JP] Japan ................................ 59-243676

[51] Int. Cl.$^4$ .................................................. G02B 6/00
[52] U.S. Cl. .............................. 350/96.34; 350/96.23; 350/96.30
[58] Field of Search ............... 350/96.23, 96.29, 96.30, 350/96.33, 96.34

[56] References Cited

U.S. PATENT DOCUMENTS

| 4,431,263 | 2/1984 | Garito | 350/96.34 |
|---|---|---|---|
| 4,496,210 | 1/1985 | Ansel | 65/3.41 X |
| 4,539,061 | 9/1985 | Sagiv | 156/278 |
| 4,544,499 | 10/1985 | Tran et al. | 252/629 |
| 4,560,248 | 12/1985 | Cramp et al. | 350/96.34 |
| 4,707,076 | 11/1987 | Skutnik et al. | 350/96.34 |
| 4,715,929 | 12/1987 | Ogawa | 156/643 |
| 4,756,598 | 7/1988 | Gerbi et al. | 350/96.29 |
| 4,762,392 | 8/1988 | Yamamoto et al. | 350/96.30 |

FOREIGN PATENT DOCUMENTS

| 2738506 | 3/1978 | Fed. Rep. of Germany | 65/3.41 |
|---|---|---|---|
| 55-93104 | 7/1980 | Japan | 65/3.11 |
| 57-71830 | 5/1982 | Japan | 65/3.11 |

OTHER PUBLICATIONS

Bjorksten, Johan and Yaeger, L. L.; Bjorksten Research Laboratories; "Vinyl Silane Size for Glass Fabric"; Modern Plastics, pp. 124, 188, Copy in 65/3.41; No Date; Date of change from 65/3C to 65/3.41 is Jul. 27, 1981.

*Primary Examiner*—Frank Gonzalez
*Attorney, Agent, or Firm*—Wenderoth, Lind & Ponack

[57] ABSTRACT

Disclosed is an optical fiber which comprises a core, a clad formed on the core, and a protection layer formed on the clad. The protection layer is a monomolecular film of silane surface active agent. The optical fiber has high wet-proof characteristic.

8 Claims, 5 Drawing Sheets

OPTICAL FIBER AND METHOD OF PRODUCING THE SAME

This application is a division of now abandoned application Ser. No. 799,452, filed Nov. 18, 1985.

BACKGROUND OF THE INVENTION

This invention relates to an optical fiber and a method of producing the same, and more particularly to a protection layer which protects the optical fiber.

In a conventional optical fiber, silicon or epoxy resin is coated on an optical fiber as a protection layer. However, such protection layer of silicon or epoxy resin is not sufficiently reliable. That is, in an optical fiber with a conventional protection layer, water is impregnated into the core portion of the optical fiber through the protection layer so that photo transmittance decreases.

SUMMARY OF THE INVENTION

Accordingly, a principal object of the invention is to provide an optical fiber which has high reliability, in particular, high wet-proof characteristic, and to provide a method of producing the optical fiber.

This and other objects of the invention will be accomplished by an optical fiber which comprises a core, a clad formed on the core, and a protection layer formed on the clad. The protection layer is a monomolecular film of silane surface active agent.

In a specific embodiment, molecules of the silane surface active agent are polymerized to one another, and adsorbed to the cladding layer chemically. A chemical substance of $CH_2=CH-(CH_2)_n-SiCl_3$ (n: integer) may be used as the silane surface active agent. Hydroxy groups may be added to the vinyl groups of the silane surface active agent by use of diborane and alkaline hydrogen peroxide. A part of the hydrocarbon of the silane surface active agent may be replaced by a functional group of $-C\equiv C-C\equiv C-$. Vinyl groups of the silane surface active agent may be bridged to one another by energy beam-irradiation thereto. Fluorine may be added to vinyl groups of the silane surface active agent by processing in plasma gas including fluorine.

This invention also relates to an optical fiber which comprises a core, and a clad formed on the core. The clad is a monomolecular film of silane surface active agent.

This invention further relates to a method of producing an optical fiber which comprises the steps of forming an optical fiber base from a preform by heating the preform, and forming a monomolecular film of silane surface active agent on the base by use of chemical adsorption method. The base may comprise a core only or both a core and a clad formed on said core.

This invention has various advantages, among which are as follows.

(1) This invention makes it possible to provide an optical fiber which has high reliability, in particular, high wet-proof characteristic since the surface of the fiber is covered by a protection layer of high anti-wet characteristic.

(2) The protection layer may be used as a cladding layer of an optical fiber. In this case, a cladding layer may be formed in lower temperature and therefore, be applicable to a crystal fiber such as an infrared fiber using a metal halide on which it is difficult to form a cladding layer.

(3) Since a silane surface active agent is used as a material for a protection layer, the surface of the protection layer has electric conductivity to thereby prevent electric charging.

(4) Since it may be possible to control thickness of a protection layer, wet-proof characteristic and mechanical strength of the layer may be readily improved.

While the novel features of the invention are set forth with particularity in the appended claims, the invention, both as to organization and content, will be better understood and appreciated, along with other objects and features thereof, from the following detailed description in conjunction with the drawings.

DETAILED DESCRIPTION OF THE INVENTION

Figure 1:
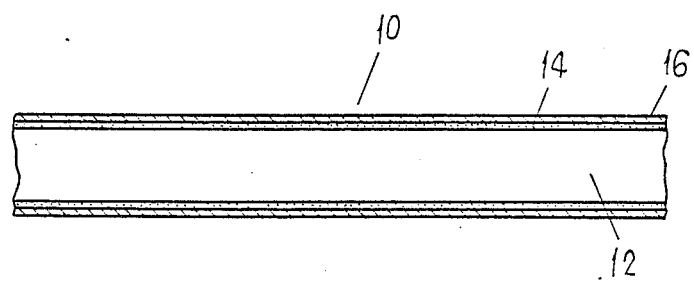
FIG. 1 is a section view of an optical fiber as a first embodiment of the invention.
Figure 2:
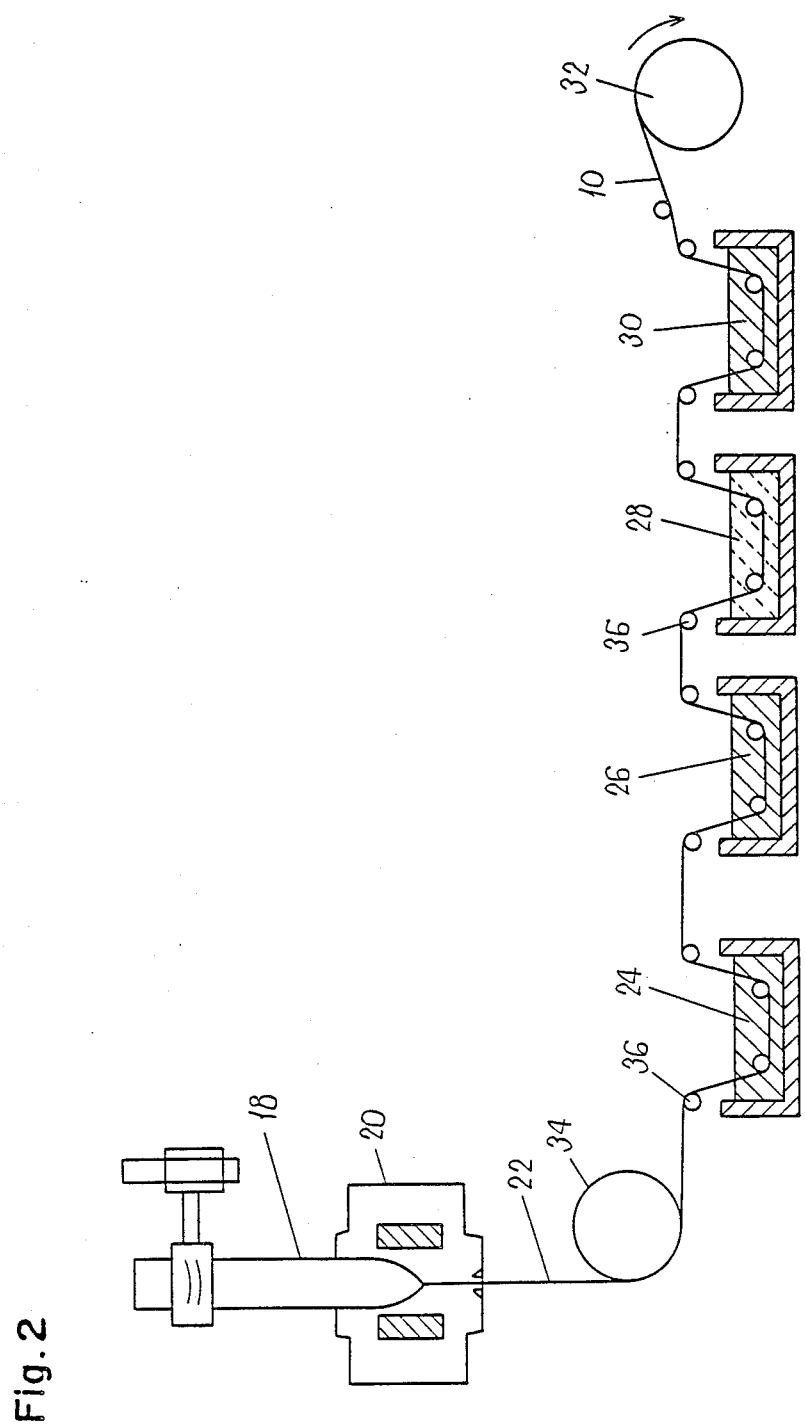
FIG. 2 shows an apparatus for producing the optical fiber.
Figure 3:
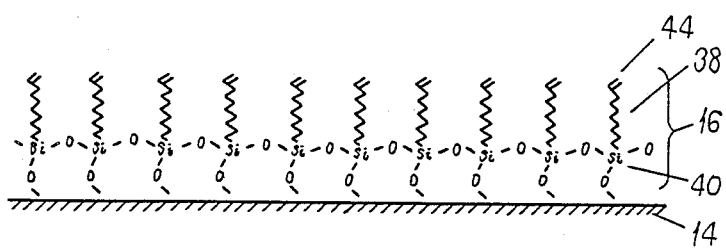
FIGS. 3, 4 and 5 show processes for producing the optical fiber of the first embodiment.

FIGS. 1, 2 and 3 show an optical fiber of a first embodiment of the invention. The optical fiber 10, as shown in FIG. 1, is constructed as follows. That is, there is provided a quartz core 12. A quartz deviation clad 14 is formed on the whole surface of the quartz core 12. A protection layer 16 is formed on the whole surface of the clad 14. The protection layer 16 is made from silane surface active agent. That is, the silane surface active agent is polymerized by chemical bonding of Si—O, and adsorbed to the clad 14 chemically by use of chemical adsorption so that protection layer or protection film 16 is formed.

FIG. 2 shows an apparatus for producing the optical fiber. In FIG. 2, preform 18 passes through heating furnace 20 so that an optical fiber base 22 is obtained. The preform comprises a core only or both a core and a clad formed on the core. In this embodiment, the latter preform is used. The base 22 passes through, first absorption solution 24, first reaction solution 26, second reaction solution 28, second absorption solution 30, respectively so that an optical fiber 10 with protection layer 16 is obtained and taken up by take-up drum 32. In FIG. 2, 34, 36 denote guide capstan for forming a tape feed path.

For example, as the absorption solution 24, there is provided a solution of 80% n-hexane, 12% carbon tetrachloride and 8% chloroform in which the silane surface active agent 38, $CH_2=CH-(CH_2)_n-SiCl_3$ (n: integer, the value of approximately 10~20 is the easiest to handle) is dissolved in a concentration of approximately $2\times10^{-3}\sim5.0\times10^{-2}$ mol/l. Then, the optical fiber is immersed in the above-stated solution right after it is supplied from furnace 20. As a result, bonding 40 of

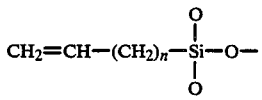

is formed shown in FIG. 3 between clad 14 and the silane surface active agent 38 so that protection layer 16, which is a monomolecular film of the silane surface active agent, is formed. In this case, vinyl groups ($CH_2=CH-$) 44, which are located at one end of the silane surface active agent 38, are juxtaposed on the surface of the protection layer 16.

Figure 4:
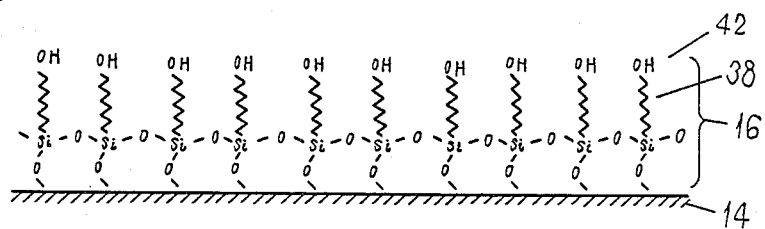

Then, the optical fiber, as shown in FIG. 2, is immersed into first reaction solution 26 which is a tetrahydrofurance diborane $-1$ Mol/l, at room temperature, and then, immersed into second reaction solution 28 which is a solution of NaOH$-0.1$ Mol/l, and 30% $H_2O_2$. As a result, OH groups 42 are added to the vinyl groups 44 on the surface of the protection layer 16 as shown in FIG. 4. Thereafter, another silane surface active agent 46 is added to the surface of the protection layer 16 by use of chemical adsorption method. That is, bonding 48 of

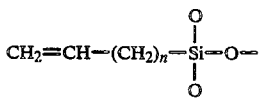

is formed between the OH groups 42 and the silane surface active agent 46 so that another monomolecular film 50 is formed on the monomolecular film 16. By repeating the above-stated process including the chemical adsorption process and OH adding process, a protection film having the thickness needed can be formed. Incidentally, 52 denotes a vinyl group which is located at one end of silane surface active agent 46.

In the above embodiment, quartz group optical fiber including $SiO_2$ is used as one example, but the protection layer 16 may be applicable to an optical fiber which is made from heavy metal oxide glass, halide glass, chalcogen glass, metal halide, etc.

Figure 5:
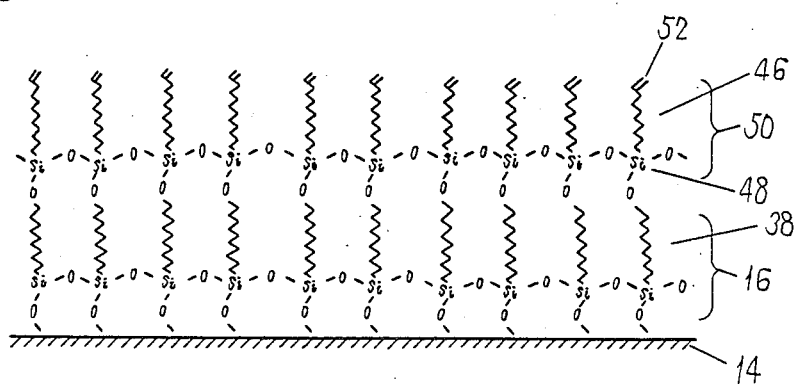
Figure 6:
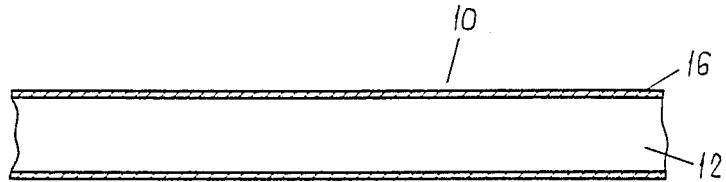
FIG. 6 is a section view of an optical fiber as a second embodiment of the invention.

Second embodiment of the invention is shown in FIG. 6. In the first embodiment, protection layer 16 is formed on clad 14. However, since silane surface active agent of protection layer 16 is of high purity and lower refractive index of about 1.43 compared to that of melted silica, it is possible to form protection layer 16 directly on core 12 as clad. It is also possible to change the refractive index layer by layer by changing the kind of silane surface active agent layer by layer. For example, in FIG. 5, layer 16 has a certain refractive index and layer 50 has another refractive index which is different from the refractive index of layer 16. That is, as shown in FIG. 6, clad 16 is formed directly on core 12 to thereby provide an optical fiber of excellent optical characteristic that the refractive index of the clad is controlled precisely.

Incidentally, acetylene group or cyano group may be used instead of the vinyl group of the silane surface active agent. dichloro silane group, mono chloro silane group or an agent in which both groups are mixed may be used instead of trichloro silane group.

Figure 7:
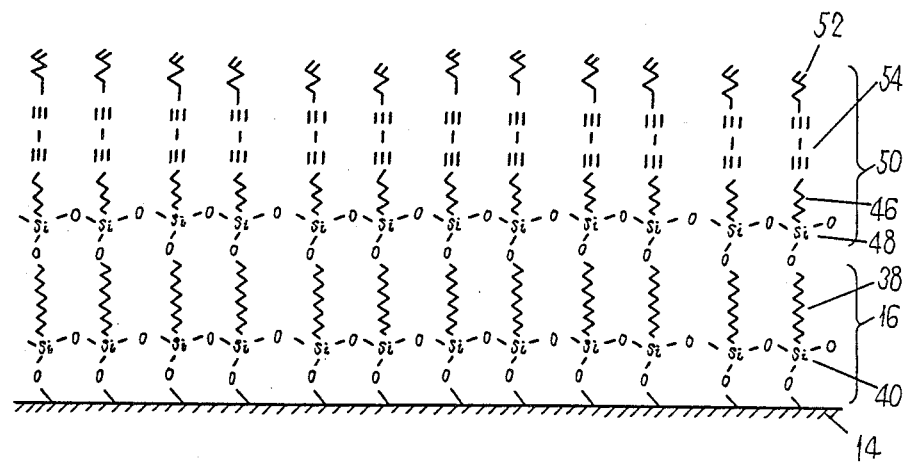
FIGS. 7 and 8 show processes for producing an optical fiber of a third embodiment of the invention.
Figure 8:
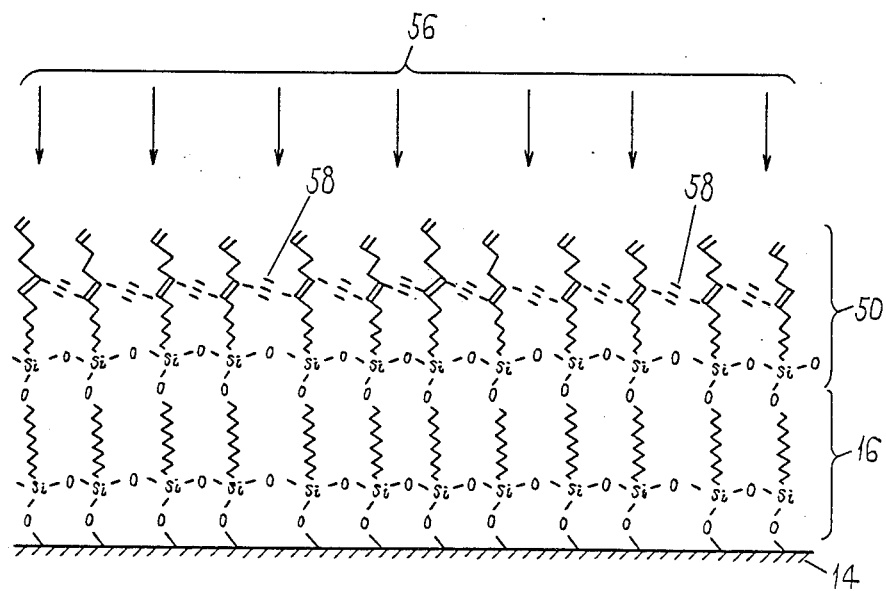

Third embodiment of the invention is shown in FIGS. 7 and 8. The structure shown in FIG. 7 is almost the same as that shown in FIG. 5. The difference is that diacetylene group ($-C\equiv C-C\equiv C-$) 54 is included in normal chain carbon bonding ($-(CH_2)_n-$) of the silane surface active agent 46. That is, the silane surface active agent 46 in FIG. 7 is, for example, $CH_2=CH-(CH_2)_n-C\equiv C-C\equiv C-(CH_2)_m-SiCl_3$ (wherein, m, n: integer, $m+n=14\sim 20$).

Energy beam 56 (see, FIG. 8) is irradiated on the surface of the protection film $16+50$ in FIG. 7 so that the diacetylene groups 54 are bonded (see, 58 in FIG. 8) on the whole surface of the medium and the accumulated protection film $16+50$ has electric conductivity in the surface direction thereof.

Figure 9:
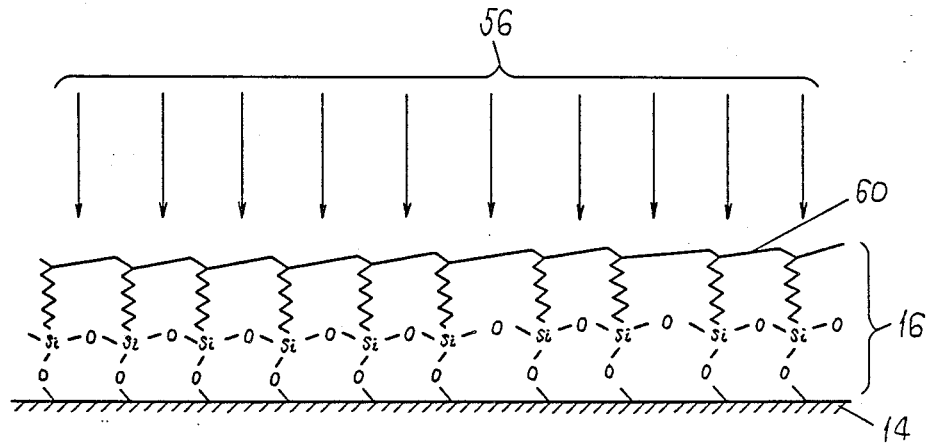
FIG. 9 is a section view of an optical fiber of a fourth embodiment of the invention.

Fourth embodiment of the invention is shown in FIG. 9. In FIG. 9, energy beam 56 such as electron beam, X-ray, $\gamma$-ray, ultra violet ray, ion beam, etc. is irradiated on the surface of the protection layer 16 so that vinyl groups 44 are bridged (see, 60 in FIG. 9) to one another, and the protection layer 16, i.e., monomolecular film is reinforced and stabilized.

Figure 10:
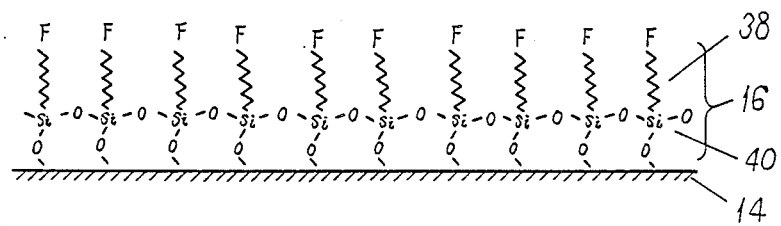
FIG. 10 is a section view of an optical fiber of a fifth embodiment of the invention.

Fifth embodiment of the invention is shown in FIG. 10. In this embodiment, the optical fiber of the structure shown in FIG. 3 is processed in an atmosphere of high frequency plasma gas such as $CF_4$ which includes fluorine and is of approximately $10^{-3}$ torr. As a result, adding of F and the above-stated bridging are simultaneously carried out, and it also becomes possible to improve the wet-proof characteristic of the surface of the fiber.

While specific embodiments of the invention have been illustrated and described herein, it is realized that modifications and changes will occur to the skilled in the art. It is therefore to be understood that the appended claims are intended to cover all modifications and changes as fall within the true spirit and scope of the invention.

What is claimed is:

1. An optical fiber comprising:
   a core;
   a clad formed on said core; and
   a protection layer formed on said clad, said protection layer being a monomolecular film of a silane surface active agent of the formula $CH_2=CH-(CH_2)_n-SiCl_3$ in which n is an integer.

2. The optical fiber of claim 1, wherein vinyl groups of said silane surface active agent are bridged to one another by energy beam-irradiation thereto.

3. The optical fiber of claim 1, wherein fluorine is added to vinyl groups of said silane surface active agent by processing in plasma gas including fluorine.

4. The optical fiber of claim 1, wherein molecules of said silane surface active agent are polymerized to one another and are chemically adsorbed on said clad.

5. The optical fiber of claim 1, wherein hydroxy groups are added to vinyl groups of said silane surface active agent by use of diborane and alkaline hydrogen peroxide.

6. An optical fiber comprising:
   a core; and
   a clad formed on said core, said clad being a monomolecular film of a silane surface active agent of the formula $CH_2=CH-(CH_2)_n-SiCl_3$ where n is an integer.

7. The optical fiber of claim 6, wherein molecules of said silane surface active agent are polymerized to one another by chemical bonding of Si—O and are chemically adsorbed on said core.

8. An optical fiber comprising:

a core;
a clad formed on said core; and
a protection layer formed on said clad, said protection layer being a monomolecular film of a silane surface active agent of the formula $CH_2=CH-(CH_2)_n-SiCl_3$ in which n is an integer and at least one of the $CH_2$ groups in the $(CH_2)_n$ is replaced by a functional group of $-C\equiv C-C\equiv C-$.

* * * * *